United States Patent
Walker et al.

(10) Patent No.: US 9,932,510 B2
(45) Date of Patent: Apr. 3, 2018

(54) LOST-CIRCULATION MATERIALS OF TWO DIFFERENT TYPES OF FIBERS

(71) Applicant: Halliburton Energy Services, Inc., Houston, TX (US)

(72) Inventors: Jonathan P. Walker, Cypress, TX (US); Donald L. Whitfill, Kingwood, TX (US); Sharath Savari, Stafford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/300,726

(22) PCT Filed: Jun. 10, 2014

(86) PCT No.: PCT/US2014/041778
§ 371 (c)(1),
(2) Date: Sep. 29, 2016

(87) PCT Pub. No.: WO2015/191055
PCT Pub. Date: Dec. 17, 2015

(65) Prior Publication Data
US 2017/0166795 A1    Jun. 15, 2017

(51) Int. Cl.
| | | |
|---|---|---|
| C09K 8/035 | (2006.01) |
| C09K 8/68 | (2006.01) |
| E21B 43/26 | (2006.01) |
| C09K 8/50 | (2006.01) |
| C09K 8/74 | (2006.01) |
| E21B 21/00 | (2006.01) |
| E21B 33/138 | (2006.01) |

(52) U.S. Cl.
CPC .............. *C09K 8/035* (2013.01); *C09K 8/501* (2013.01); *C09K 8/68* (2013.01); *C09K 8/74* (2013.01); *E21B 21/003* (2013.01); *E21B 33/138* (2013.01); *E21B 43/26* (2013.01); *C09K 2208/08* (2013.01)

(58) Field of Classification Search
CPC ...... C09K 2208/08; C09K 8/516; C09K 8/03; C09K 8/035; C09K 2208/18; C09K 8/487; C09K 8/04; C09K 8/32; E21B 21/003
See application file for complete search history.

(56) References Cited

U.S. PATENT DOCUMENTS

| | | |
|---|---|---|
| 2003/0132000 A1 | 7/2003 | Shaarpour |
| 2009/0054269 A1 | 2/2009 | Chatterji et al. |
| 2011/0183874 A1 | 7/2011 | Ghassemzadeh |
| 2012/0316089 A1 | 12/2012 | Kulkarni et al. |
| 2013/0118742 A1 | 5/2013 | Shindgikar et al. |

OTHER PUBLICATIONS

International Search Report and Written Opinion dated Feb. 9, 2015; International PCT Application No. PCT/US2014/041778.

*Primary Examiner* — Zakiya W Bates
(74) *Attorney, Agent, or Firm* — McGuireWoods LLP

(57) ABSTRACT

A treatment fluid comprising: a base fluid; a plurality of a first type of fiber, wherein the first type of fiber is degradable; a plurality of a second type of fiber; and a third lost-circulation material, wherein the first type of fibers, the second type of fibers, and the third lost-circulation material inhibit or prevent some or all of the treatment fluid from penetrating into a subterranean formation from a wellbore, wherein the wellbore penetrates the subterranean formation.

23 Claims, 1 Drawing Sheet

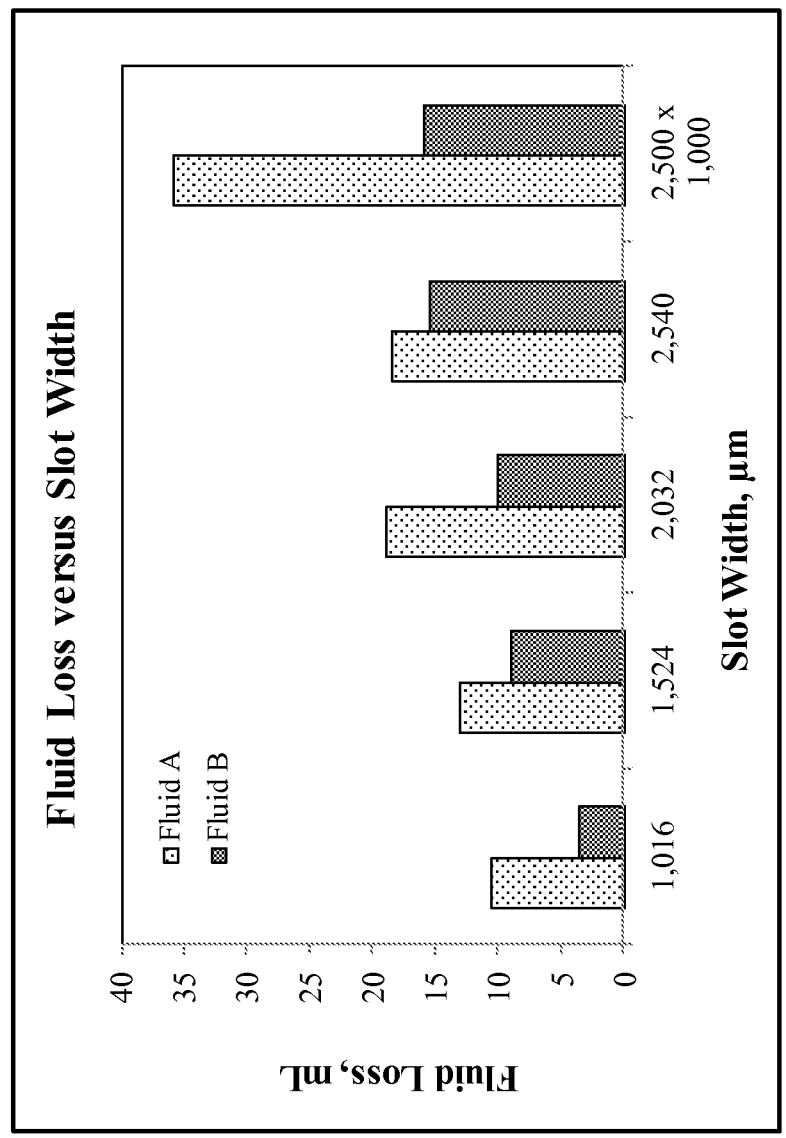

LOST-CIRCULATION MATERIALS OF TWO DIFFERENT TYPES OF FIBERS

TECHNICAL FIELD

During oil and gas operations, some or total loss of a drilling fluid can undesirably flow into a subterranean formation. This is known as lost circulation. A lost-circulation material can be used to inhibit or prevent lost circulation into the formation. Various additives, known as lost-circulation materials, can be included in a treatment fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 1 is a bar graph of fluid loss versus the slot width for two different lost circulation fluids according to certain embodiments.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more types of fibers, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but can have more than one dispersed phase. It is to be understood that any of the phases of a heterogeneous fluid (e.g., a continuous or dispersed phase) can contain dissolved or undissolved substances or compounds. As used herein, the phrase "base fluid" means the solvent of a solution or the continuous phase of a heterogeneous fluid. The base fluid will necessarily be the fluid that is in the greatest quantity of a treatment fluid.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, a geothermal well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. During drilling or other operations such as completion, some or all of the base fluid and the included heterogeneous materials of the treatment fluid can undesirably flow into the subterranean formation instead of remaining in the wellbore and being circulated back up to the wellhead. This is known as lost circulation. Severe lost circulation can occur, in which greater than about 50 barrels of fluid is lost per hour. Severe lost circulation can occur, for example, when the dimensions of the highly-permeable area are large. For example, some fractures can have a larger opening compared to other fractures. In order to overcome the problems associated with lost circulation, lost-circulation materials ("LCM") can be included in a treatment fluid. LCMs can be swellable or non-swellable, granular-shaped or other geometric-shaped substances. As the treatment fluid is placed into the well, the LCM can eliminate or lessen the amount of liquid or total fluid entering the subterranean formation. For example, the particles of the LCM can build upon each other and form a bridge over highly-permeable areas of the formation, such as natural fissures, fractures, and vugs, or induced fractures. The bridge can eliminate or reduce the amount of liquid base fluid entering the formation via the wellbore.

Lost-circulation materials can include sized particles, such as calcium carbonate, graphitic-based materials, nutshells, and optionally swellable particles. A residue can be deposited within the highly-permeable areas of the formation when a fluid is forced against the formation under pressure. The filtrate is the liquid that passes through the permeable area, leaving the residue within the permeable area. The calcium carbonate, graphitic-based materials, nutshells, and swellable particles can be the residue, which after flowing into the permeable area, are commonly called a plug. The residue can also be used to bind fines together, such as sand, can also reduce damage to formation permeability, and can also stabilize the highly-permeable area.

It is often desirable to remove at least a portion of a residue plug at some stage in the production process. The residue plug is often removed in order to restore fluid flow through the highly-permeable area. Therefore, the lost circulation materials can be degradable. Some additives can be degraded by dissolving in an acidic fluid. One common technique for removing the residue is to perform an acid wash. In an acid wash, a wash pipe is inserted into the wellbore. An aqueous solution of an acid or an acid precursor is then flowed through the wash pipe under pressure and the acid comes in contact with the residue plug. The acid can chemically react with some of the ingredients in the residue, causing those ingredients to solubilize, and thus causing the residue plug to be removed from the well. The acid wash can also be used to penetrate into the subterranean formation in order to increase the permeability of the formation.

However, depending on the size of the openings into the highly-permeable areas, the LCM may not form a complete plug. As a result, some of the fluid may still be lost into the subterranean formation. Thus, there is a need for improved, large-sized, degradable LCMs that can be used in a treatment fluid for dealing with losses in a reservoir. It has been discovered that when at least two different types of fibers are used in a treatment fluid along with at least one other LCM, then a synergistic effect occurs. Surprisingly it was discovered that the synergistic effect provided a decrease in lost circulation in all sizes of the openings in the highly-permeable areas.

It is to be understood that if any laboratory test (e.g., fluid loss) requires the test be performed at a specified temperature and possibly a specified pressure, then the temperature and pressure of the test composition is ramped up to the specified temperature and pressure after being mixed at ambient temperature and pressure. For example, the composition can be mixed at 71° F. (22° C.) and 1 atm (0.1 MPa) and then placed into the testing apparatus and the temperature of the composition can be ramped up to the specified temperature. As used herein, the rate of ramping up the temperature can be in the range of about 1° F./min to about 10° F./min to simulate actual wellbore conditions. After the composition is ramped up to the specified temperature and possibly specified pressure, the composition is maintained at that temperature and pressure for the duration of the testing.

If any laboratory test (e.g., fluid loss) requires the step of mixing, then the treatment fluid is mixed according to the following procedures. A known volume (in units of barrels) of the base fluid is added to a mixing container and the ingredients of the treatment fluid are then added to the mixing container. The container is then placed on a mixer base. The motor of the base is then turned on and maintained at 11,000 revolutions per minute (rpm) and mixed for at least 5 minutes. It is to be understood that any mixing is performed at ambient temperature and pressure (about 71° F. (22° C.) and about 1 atm (0.1 MPa)).

As used herein, the "fluid loss" of a treatment fluid is tested according to the following procedure. The treatment fluid is mixed. The treatment fluid is poured into a filter cell fitted with a plate having a slot. A lower valve stem is opened and the specified pressure differential is set. A timer is started and filtrate that is pushed through the slot is collected in a separate volumetric container. The testing is performed for 30 min. The total volume of filtrate collected is read. Fluid loss is measured in milliliters (mL) of fluid collected in 30 min.

According to an embodiment, a treatment fluid comprises: a base fluid; a plurality of a first type of fiber, wherein the first type of fiber is degradable; a plurality of a second type of fiber; and a third lost-circulation material, wherein the first type of fibers, the second type of fibers, and the third lost-circulation material inhibit or prevent some or all of the treatment fluid from penetrating into a subterranean formation from a wellbore, wherein the wellbore penetrates the subterranean formation.

According to another embodiment, a method of treating a portion of wellbore comprises: introducing the treatment fluid into the portion of the wellbore.

The discussion of preferred embodiments regarding the treatment fluid or any ingredient in the treatment fluid, is intended to apply to all of the composition, method, and system embodiments. Any reference to the unit "gallons" means U.S. gallons.

It is to be understood that while the treatment fluid can contain other ingredients, it is the combination of the first, second, and third lost-circulation materials that are primarily or wholly responsible for providing the requisite fluid loss control. For example, a test treatment fluid consisting essentially of, or consisting of, the base fluid and the lost-circulation materials and in the same proportions as the treatment fluid can have a desirable fluid loss. Therefore, it is not necessary for the treatment fluid to include other additives, such as other lost-circulation materials or fluid loss additives to provide the desired fluid loss control. It is also to be understood that any discussion related to a "test treatment fluid" is included for purposes of demonstrating that the treatment fluid can contain other ingredients, but it is the lost-circulation materials that create the desirable fluid loss. Therefore, while it may not be possible to perform a test in a wellbore for the specific treatment fluid, one can formulate a test treatment fluid to be tested in a laboratory to identify if the ingredients and concentration of the ingredients will provide the stated fluid loss.

The treatment fluid includes a base fluid. The treatment fluid can be a heterogeneous fluid, for example, a slurry or an emulsion or invert emulsion. Any of the phases of the heterogeneous fluid can contain dissolved substances and/or undissolved substances. The base fluid can be the liquid continuous phase of the heterogeneous fluid. The base fluid can be an aqueous liquid, an aqueous miscible liquid, or a hydrocarbon liquid. Suitable aqueous-based fluids can include, but are not limited to, fresh water; saltwater (e.g., water containing one or more water-soluble salts dissolved therein); brine (e.g., saturated salt water); seawater; and any combination thereof. Suitable aqueous-miscible fluids can include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® an isoalkane and n-alkane; BIO-BASE 300™ a linear alkane; BIO-BASE 560® a blend containing greater than 90% linear alkanes; and ESCAID 110™ a mineral oil blend of mainly alkanes and cyclic alkanes. The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include ENCORE® drilling fluid and ACCOLADE® internal olefin and ester blend drilling fluid, marketed by Halliburton Energy Services, Inc. An example of a diesel oil-based drilling fluid is INVERMUL®, marketed by Halliburton Energy Services, Inc.

The treatment fluid includes a plurality of a first type of fiber. The treatment fluid also includes a plurality of a second type of fiber. As used herein, the term "fiber" means a solid that is characterized by having a high aspect ratio of length to diameter. For example, a fiber can have an aspect ratio of length to diameter from greater than about 2:1 to about 5,000:1. As used herein, the term "fibrillated fibers" and all grammatical variations thereof means fibers bearing sliver-like fibrils along the length of the fiber. The fibrils extend from the fiber, often referred to as the "core fiber," and have a diameter significantly less that the core fiber from which the fibrils extend.

The first and second type of fibers can be in dry form or in a liquid suspension. At least the first type of fiber is degradable. As used herein, the term "degradable" means that the substance breaks down into smaller fragments, decomposes, becomes soluble, or otherwise breaks down or deteriorates. The degradable fibers can be degraded via a reaction with an acid. Of course, the fibers can be degraded via other chemical reactions. The second type of fibers can also be degradable or can be non-degradable. The first and second type of fibers can be natural, synthetic, degradable, biocompatible, or combinations thereof. Examples of synthetic fibers include, but are not limited to, polymers or copolymers composed of polypropylene, polyaramid, polyester, polyacrylonitrile, and polyvinyl alcohol. Examples of degradable fibers include, but are not limited to, fibers composed of starch-g-poly (2-propenamide-co-2-propenoic acid) potassium salt, modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers include, fibers of cellulose including viscose cellulosic fibers, oil coated cellulosic fibers, and fibers derived from a plant product like paper fibers; carbon fibers; melt-processed inorganic fibers including basalt fibers, wollastonite fibers, non-amorphous metallic fibers, ceramic fibers, and glass fibers. The first and second type of fibers can also be a composite fiber made from any combination of the preceding materials. As used herein, the term "type" with reference to the fibers means that the plurality of fibers are made from the same material or compound (e.g., polypropylene). The first and second type of fibers can have a fiber length, diameter, and concentration. The fibers can have a length to diameter aspect ratio in the range of about 2:1 to about 5,000:1. Some or all of the first and/or second type of fibers can be fibrillated.

The first type of fibers and the second type of fibers can each be in a concentration in the range of about 0.1% to about 20% by weight of the base fluid. Preferably, the first type of fibers and the second type of fibers are in a total concentration in the range of about 1% to about 20% by weight of the base fluid. Preferably, the first type of fibers is in a greater concentration than the second type of fibers. For example, the first type of fibers can be in a concentration of about 20% by weight of the base fluid and the second type of fibers can be in a concentration of about 1% by weight of the base fluid. In this manner, the first type of fibers being a degradable fiber can degrade downhole to help restore fluid communication after a desired amount of time. If the second type of fiber is also degradable, then the concentrations of the first and second types of fibers can be more proportional.

The first and second types of fibers can have a fiber length. The first and second types of fibers can have a distribution such that at least 90% of the fibers have a length in the range of about 0.5 millimeters (mm) to about 3 mm. The fiber length and concentration may be inversely related. For example, as the fiber length increases, the concentration can decrease. For a given concentration of fibers, the desired fluid loss may be achieved by increasing the fiber length. By contrast, for a given fiber length, the desired fluid loss may be achieved by increasing the concentration of the fibers.

The treatment fluid also includes a third LCM. According to an embodiment, the third LCM is ground oyster shells. Oyster shells are useful as an LCM for their particle size and plate-like structure. The plate-like structure can provide a good structural foundation in which other LCMs (including the first and second types of fibers) can bridge against to form a plug. According to an embodiment, the third LCM is in a concentration in the range of about 10% to about 50% by weight of the base fluid. The third LCM can also have a particle size such that at least 90% of the third LCM has a particle size in the range of about 2,000 to about 3,300 micrometers (μm).

The treatment fluid can also include one or more additional LCMs (i.e., a fourth, fifth, and so on LCMs). Suitable additional LCMs include, but are not limited to: ground coal; petroleum coke; sized calcium carbonate; asphaltenes; perlite; cellophane; cellulose; ground tire material; vitrified shale; a plastic material; paper fiber; wood; cement; hardened foamed cement; glass; foamed glass; sand; bauxite; a ceramic material; a polymeric material (such as ethylene vinyl acetate or partially-hydrated polyacrylamide "PHPA"); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; and any composite particle thereof. Examples of suitable commercially-available additional LCMs include, but are not limited to, WALL-NUT®, BARACARB®, STEELSEAL®, N-SQUEEZE™, N-PLEX™, HYDRO-PLUG®, DURO-SQUEEZE™ H, BAROFIBRE®, and BAROFIBRE® O, marketed by Halliburton Energy Services, Inc. The additional LCMs can be in a concentration in the range of about 3% to about 30% by weight of the base fluid.

One or more types of the additional LCMs can be degradable. One or more types of the additional LCMs can be water-swellable. As used herein, the term "water-swellable" means that the substance imbibes water into its structure and achieves an increase in volume after imbibing the water. A water-swellable LCM can be useful due to the ability of the LCM to swell and fill voids within the highly-permeable area and within the interstitial space of the other LCMs. One or more types of the additional LCMs can also be degradable and water-swellable. An example of a degradable and water-swellable additional LCM is a polymer containing starch grafted onto PHPA.

The additional LCMs can have a sized modal distribution of component lost-circulation material. By way of example, the treatment fluid can further include a fourth LCM, wherein the fourth LCM is sized calcium carbonate. The calcium carbonate can be sized to provide three different particle sizes that make up the sized modal distribution. For example, the calcium carbonate can include fine pieces having a one particle size of about 40 μm to about 400 μm, medium pieces having a one particle size in the range of from about 300 μm to about 700 μm, and coarse pieces having a one particle size in the range of from about 700 μm to about 1,700 μm. A sized modal distribution can be beneficial for providing better fluid loss due to the ability of the different sized particles to fill the voids between other LCM pieces and/or within the highly-permeable area. The distribution can also allow for better bridging of the pieces of LCM to provide reduced fluid loss into the formation.

At least the first type of fibers, the second type of fibers, and the third lost-circulation material inhibit or prevent some or all of the treatment fluid from penetrating into a subterranean formation from a wellbore, wherein the wellbore penetrates the subterranean formation. According to certain embodiments, at least the first type of fibers, the second type of fibers, and the third lost-circulation material provide a fluid loss of less than 30 milliliters (mL), preferably less than 20 mL at a pressure of 1,000 pounds force per square inch "psi" (6.9 megapascals "MPa"). According to certain other embodiments, at least the first type of fibers, the second type of fibers, and the third lost-circulation material provide a fluid loss of less than 30 milliliters (mL), preferably less than 20 mL, at the bottomhole temperature and pressure of the subterranean formation. As used herein, the term "bottomhole" means the location within the wellbore or subterranean formation where the fluid is located. It is contemplated by the disclosures herein that the fibers and LCM can advantageously reduce fluid loss regardless of the dimensions of the highly-permeable area. The fibers and LCM can bridge upon one another and the bridges can help inhibit or prevent fluid flow from the wellbore into the formation or also from the formation into the wellbore (depending on the specific oil or gas operation being performed). It should be understood that while some of the treatment fluid may penetrate into the subterranean formation, the majority of the treatment fluid should remain in the wellbore or space to be filled with the treatment fluid (e.g., a fracture). Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation. According to an embodiment, the first type of fibers, the second type of fibers, and the third lost-circulation material are in at least a sufficient concentration such that fluid is inhibited or prevented from penetrating into the formation from the wellbore. The first type of fibers, the second type of fibers, and the third lost-circulation material can be in a total concentration in the range of about 20% to about 50% by weight of the base fluid.

The third and additional LCM particles can be of any shape combination compatible with the specifics of the wellbore and subterranean formation that is penetrated by the wellbore. The LCMs can be substantially spherical or substantially non-spherical in shape and can also be hollow. The LCM particles can be, for example, spherical-shaped; cubic-shaped; rod-shaped; cone-shaped; ellipse-shaped; cylinder-shaped; polygon-shaped; pyramid-shaped; torus-shaped; cross-shaped; lattice-shaped; star-shaped; or any other shape.

The treatment fluid can be any fluid used in an oil or gas operation where prevention of lost circulation is desirable. For example, the treatment fluid can be, without limitation, a drilling fluid, spacer fluid, completion fluid, fracturing fluid, or acidizing fluid.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The viscosifiers can comprise any substance (e.g., a polymeric material) capable of increasing the viscosity of the treatment fluid. In certain embodiments, the viscosifier can comprise one or more polymers that have at least two molecules that are capable of forming a crosslink in a cross-linking reaction in the presence of a crosslinking agent, and/or polymers that have at least two molecules that are so cross-linked (i.e., a cross-linked viscosifier). The viscosifiers can be naturally-occurring; synthetic; or a combination thereof. The viscosifiers of the present invention may also be cationic; anionic; or a combination thereof. Suitable viscosifiers for use in the treatment fluids of the present invention include, but are not limited to, polysaccharides; biopolymers; and/or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof. For a polymeric viscosifier, the polymer molecules can be cross-linked with a suitable cross-linking agent.

Suitable filtration control agents can comprise any substance capable of managing filtration, including bridging, bonding, deflocculation, and viscosity. The filtration control agents can also function to reduce filter cake permeability. Suitable filtration control agents include, but are not limited to, polyanionic cellulose; polyacrylate; modified lignite; powdered resin; modified starch; carboxymethylcellulose; and any combination thereof. Suitable commercially-available filtration control agents include PAC™-R and DEX-TRID®, marketed by Halliburton Energy Services, Inc. The filtration control agent can be in a concentration in the range of about 0.1 to about 20 ppb of the treatment fluid, preferably about 0.1 to about 5 ppb of the treatment fluid.

Suitable shale stabilizers can include, but are not limited to, long chain alcohols; polyols; polyglycols; amine inhibitor; sodium or potassium silicate; partially hydrolyzed polyacrylamides; polyalkene glycols; anionic surfactants; salt solutions containing, for example, sodium chloride, potassium chloride, or ammonium chloride; cationic polymers and oligomers, for example, poly(dimethyldiallylammonium chloride), cationic poly(acrylamide) and cationic poly(dimethylaminoethylmethacrylate); and any combination thereof. Examples of commercially-available shale stabilizers include CLAY SYNC™, CLAYSEAL® PLUS, PERFORMATROL®, GEM™ GP, GEM™ CP, BORE-HIB®, BARO-TROL® PLUS, EZ-MUD®, EZ-MUD® GOLD, and BARASIL™-S, marketed by Halliburton Energy Services, Inc. The shale stabilizer can be in a concentration in the range of about 0.1 to about 30 ppb of the treatment fluid, preferably about 1 to about 15 ppb of the treatment fluid.

The weighting agent can be any material capable of increasing the density of the treatment fluid. The weighting agent can additionally aid in controlling formation pressures and stabilizing the wellbore. Suitable weighting agents include, but are not limited to, barite; hematite; ilmentite; manganese tetraoxide; galena; calcium carbonate; iron oxide; manganese oxide; magnetite; siderite; celesite; dolomite; manganese carbonate and any combination thereof. Examples of a commercially-available weighting agents include, but are not limited to, BAROID®, BARODENSE®, MICROMAX™, and combinations thereof, marketed by Halliburton Energy Services, Inc. The weighting agent can be in a concentration in the range of about 1 to about 1,500 ppb (about 4 to about 5,800 kilograms per cubic meter "$kg/m^3$") of the treatment fluid, preferably about 10 to about 700 ppb of the treatment fluid. According to another embodiment, the weighting agent is in at least a sufficient concentration such that the treatment fluid has a density in the range of about 9 to about 20 pounds per gallon (ppg) (about 1.078 to about 2.397 kilograms per liter "kg/L").

Suitable pH buffers can be any pH buffer capable of controlling the pH of the treatment fluid (e.g., increasing or decreasing the pH). The pH buffers can be included in the treatment fluid to enhance the stability of the treatment fluid, for example. Suitable pH buffers can include, but are not limited to: sodium carbonate; potassium carbonate; sodium bicarbonate; potassium bicarbonate; sodium diacetate; potassium diacetate; ammonium diacetate; sodium phosphate; potassium phosphate; sodium hydrogen phosphate; potassium hydrogen phosphate; sodium dihydrogen phosphate; potassium dihydrogen phosphate; sodium borate; magnesium oxide; sulfamic acid; sodium hydroxide; potassium hydroxide; citric acid; tartaric acid; and any combination thereof. The pH buffer can be in at least a sufficient concentration to maintain the pH of the treatment fluid at a desired level.

The treatment fluid can also include a friction reducer. Commercially-available examples of a suitable friction reducers include, but are not limited to, BARO-LUBE GOLD SEAL™, TORQ-TRIM® II, graphitic carbon, and combinations thereof, marketed by Halliburton Energy Services, Inc. The friction reducer can be in a concentration of at least 0.5 ppb (2 $kg/m^3$) of the drilling fluid. In an embodiment, the friction reducer is in a concentration in the range of about 0.5 to about 5 ppb (about 2 to about 19 $kg/m^3$) of the drilling fluid.

According to an embodiment, the methods include the step of introducing the treatment fluid into a portion of the wellbore. The well can be an oil, gas, or water production well, a geothermal well, or an injection well. The well includes the wellbore. The wellbore penetrates the subterranean formation. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus.

The methods can further include introducing a spacer fluid into the wellbore after the step of introducing the treatment fluid. The methods can also further include introducing a cement composition into the wellbore after the step of introducing the treatment fluid and/or the spacer fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the wellbore. The step of introducing can include introducing the cement composition into a portion of an annulus. Of course there can also be more than one treatment fluid introduced into a portion of the wellbore. The treatment fluids can be the same or different, for example, one treatment fluid can be a drilling fluid and another treatment fluid can be a spacer fluid, so long as each treatment fluid contains at least the base fluid and the LCMs.

The method embodiments can also include allowing the cement composition to set. The step of allowing can be performed after the step of introducing the cement composition into the wellbore.

The methods can further include perforating, fracturing, and/or performing an acidizing treatment prior to or during the step of introducing the treatment fluid. The methods can further include contacting at least a portion of the first type of fibers, the second type of fibers, and the third lost-circulation material with a degrading agent after the step of introducing. The degrading agent can cause some or all of the degradable fibers and/or LCMs to degrade. Degradation of the degradable fibers and/or LCMs can restore fluid communication at the location of the treatment fluid. The degrading agent can be, for example, an acid if the fibers and/or LCMs are acid soluble or acid degradable. The exact type of degrading agent can be selected based on how each degradable fiber and/or LCM is degraded. There can also be more than one degrading agent that comes in contact with the fibers and/or LCMs. This embodiment is useful when the degradable fibers and/or LCMs are degraded via different chemical mechanisms.

Examples

To facilitate a better understanding of the preferred embodiments, the following examples of certain aspects of the preferred embodiments are given. The following examples are not the only examples that could be given according to the preferred embodiments and are not intended to limit the scope of the invention.

Unless stated otherwise, the treatment fluids were tested according to the procedure for the specific test as described in The Detailed Description section above. Table 1 contains ingredients and concentration in units of pounds per barrel (ppb) for two different treatment fluids of FIG. 1 having a density of 10 pounds per gallon (2.0 kilograms per liter) and included tap water as the base fluid; N-SEAL™ lost-circulation material is an acid soluble (degradable) extrusion spun mineral fiber used as the plurality of a first type of fiber; BARACARB® 1200, 600, 150, and 25 lost-circulation materials are an acid soluble ground marble that have a nominal median particle size of 1,200, 600, 150, and 25 µm, respectively; and Fiber #2 is 3 millimeter (mm) synthetic polypropylene fibers that were used as the second type of fiber. Fluid loss testing was performed at 75° F. (24° C.) and a pressure of 1,000 psi (6.9 MPa).

TABLE 1

| Ingredient | Fluid A | Fluid B |
| --- | --- | --- |
| Base Fluid | 352.68 | 352.68 |
| Oyster Shell Course ground | 33.75 | 33.75 |
| N-SEAL ™ | 20.25 | 20.25 |
| BARACARB ® 1200 | 13.5 | 13.5 |
| BARACARB ® 600 | 9 | 9 |
| BARACARB ® 150 | 9 | 9 |
| BARACARB ® 25 | 4.5 | 4.5 |
| Fiber #2 | — | 1 |

FIG. 1 is a bar graph of the fluid loss in milliliters versus slot width in millimeters for Treatment Fluid A and Fluid B. The slot length was varied to provide a consistent slot area. For example, as the slot width increased, the slot length decreased. As can be seen from FIG. 1, Fluid B that contained the second type of fiber in addition to the first type of fiber exhibited much less fluid loss compared to Fluid A that only contained the first type of fiber. This indicates that the combination of two different types of fibers creates a better fluid to combat fluid loss into a subterranean formation. As can also be seen, Fluid B had very low fluid loss even with a large slot size.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid;
   a plurality of a first type of fiber, wherein the first type of fiber is degradable;
   a plurality of a second type of fiber; and
   a third lost-circulation material,
   wherein the first and second type of fibers have a distribution such that at least 90% of the fibers have a length in the range of about 0.5 to about 3 millimeters,
   wherein the first type of fibers, the second type of fibers, and the third lost-circulation material inhibit or prevent some or all of the treatment fluid from penetrating into a subterranean formation from a wellbore, wherein the wellbore penetrates the subterranean formation.

2. The treatment fluid according to claim 1, wherein the base fluid comprises an aqueous liquid, an aqueous miscible liquid, or a hydrocarbon liquid.

3. The treatment fluid according to claim 1, wherein the second type of fibers are degradable.

4. The treatment fluid according to claim 1, wherein the first type of fibers are selected from, fibers composed of starch-g-poly (2-propenamide-co-2-propenoic acid) potassium salt, modified cellulose, chitosan, soya, modified chitosan, polycaprolactone, polylactic acid, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, mineral fiber, or copolymers thereof.

5. The treatment fluid according to claim 1, wherein the second type of fibers are selected from polymers or copolymers composed of polypropylene, polyaramid, polyester, polyacrylonitrile, polyvinyl alcohol, polycaprolactone, polylactic acid, poly(3-hydroxybutyrate), polyhydroxy-alkanoates, polyglycolic acid, polyorthoesters, polycarbonates, polyaspartic acid, polyphosphoesters, starch-g-poly (2-propenamide-co-2-propenoic acid) potassium salt, fibers composed of modified cellulose, chitosan, soya, modified chitosan, soya, viscose cellulosic fibers, oil coated cellulosic fibers, fibers derived from a plant product like paper fibers, carbon fibers, and melt-processed inorganic fibers including basalt fibers, wollastonite fibers, non-amorphous metallic fibers, ceramic fibers, and glass fibers.

6. The treatment fluid according to claim 1, wherein the first type of fibers and the second type of fibers are each in a concentration in the range of about 0.1% to about 20% by weight of the base fluid.

7. The treatment fluid according to claim 1, wherein the first and second type of fibers are in a combined total concentration in the range of about 1% to about 20% by weight of the base fluid.

8. The treatment fluid according to claim 1, wherein the third lost-circulation material is ground oyster shells.

9. The treatment fluid according to claim 1, wherein the third lost-circulation material is in a concentration in the range of about 10% to about 50% by weight of the base fluid.

10. The treatment fluid according to claim 1, wherein the third lost-circulation material has a particle size such that at least 90% of the third lost-circulation material has a particle size in the range of about 2,000 to about 3,300 micrometers.

11. The treatment fluid according to claim 1, wherein the treatment fluid further comprises one or more additional lost-circulation materials.

12. The treatment fluid according to claim 11, wherein the additional lost-circulation materials are selected from: ground coal; petroleum coke; sized calcium carbonate; asphaltenes; perlite; cellophane; cellulose; ground tire material; vitrified shale; a plastic material; paper fiber; wood; cement; hardened foamed cement; glass; foamed glass; sand; bauxite; a ceramic material; a polymeric material (such as ethylene vinyl acetate or partially-hydrated polyacrylamide "PHPA"); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; and any composite particle thereof.

13. The treatment fluid according to claim 11, wherein the additional lost-circulation materials are in a concentration in the range of about 3% to about 30% by weight of the base fluid.

14. The treatment fluid according to claim 11, wherein one or more types of the additional lost-circulation materials are degradable.

15. The treatment fluid according to claim 11, wherein one or more types of the additional lost-circulation materials are water-swellable.

16. The treatment fluid according to claim 11, wherein one or more types of the additional lost-circulation materials are degradable and water-swellable.

17. The treatment fluid according to claim 1, wherein at least the first type of fibers, the second type of fibers, and the third lost-circulation material provide a fluid loss of less than 30 milliliters at a pressure of 1,000 pounds force per square inch.

18. The treatment fluid according to claim 1, wherein at least the first type of fibers, the second type of fibers, and the third lost-circulation material provide a fluid loss of less than 30 milliliters at the bottomhole temperature and pressure of the subterranean formation.

19. The treatment fluid according to claim 1, wherein the treatment fluid is a drilling fluid, spacer fluid, completion fluid, fracturing fluid, or acidizing fluid.

20. A method of treating a portion of wellbore comprising:
introducing a treatment fluid into the portion of the wellbore, wherein the treatment fluid comprises:
a base fluid;
a plurality of a first type of fiber, wherein the first type of fiber is degradable;
a plurality of a second type of fiber; and
a third lost-circulation material,
wherein the first and second type of fibers have a distribution such that at least 90% of the fibers have a length in the range of about 0.5 to about 3 millimeters,
wherein the first type of fibers, the second type of fibers, and the third lost-circulation material inhibit or prevent some or all of the treatment fluid from penetrating into a subterranean formation from a wellbore, wherein the wellbore penetrates the subterranean formation.

21. The method according to claim 20, further comprising contacting at least a portion of the first type of fibers, the second type of fibers, and the third lost-circulation material with a degrading agent, wherein the step of contacting is performed after the step of introducing.

22. A system of treating a subterranean formation comprising:
a pump; and
a treatment fluid, wherein the treatment fluid comprises:
a base fluid;
a plurality of a first type of fiber, wherein the first type of fiber is degradable;
a plurality of a second type of fiber; and
a third lost-circulation material,
wherein the first and second type of fibers have a distribution such that at least 90% of the fibers have a length in the range of about 0.5 to about 3 millimeters,
wherein the first type of fibers, the second type of fibers, and the third lost-circulation material inhibit or prevent some or all of the treatment fluid from penetrating into a subterranean formation from a wellbore, wherein the wellbore penetrates the subterranean formation, wherein the pump pumps the treatment fluid into the subterranean formation.

23. An additive comprising:

a plurality of a first type of fiber, wherein the first type of fiber is degradable;

a plurality of a second type of fiber; and a third lost-circulation material, wherein the first and second type of fibers have a distribution such that at least 90% of the fibers have a length in the range of about 0.5 to about 3 millimeters, wherein the first type of fibers, the second type of fibers, and the third lost-circulation material inhibit or prevent some or all of a treatment fluid from penetrating into a subterranean formation from a wellbore, wherein the wellbore penetrates the subterranean formation.

* * * * *